United States Patent
Hartmann et al.

[11] Patent Number: 5,936,957
[45] Date of Patent: Aug. 10, 1999

[54] ATM COMMUNICATION SYSTEM WITH A MODULAR STRUCTURE

[75] Inventors: Siegfried Hartmann, Allershausen; Heinrich Schramm, Taufkirchen; Horst Rombach, Munich; Hilmar Lesch, Wolfratshausen, all of Germany

[73] Assignee: Siemens Aktiengesellschaft, Munich, Germany

[21] Appl. No.: 08/704,547

[22] PCT Filed: Mar. 15, 1995

[86] PCT No.: PCT/DE95/00365

§ 371 Date: Sep. 13, 1996

§ 102(e) Date: Sep. 13, 1996

[87] PCT Pub. No.: WO95/25412

PCT Pub. Date: Sep. 21, 1995

[30] Foreign Application Priority Data

Mar. 16, 1994 [DE] Germany .............................. 44 08 975

[51] Int. Cl.⁶ .................................................... H04L 12/48
[52] U.S. Cl. ........................... 370/395; 370/398; 370/410
[58] Field of Search ................................... 370/360, 395, 370/398, 410, 230, 253

[56] References Cited

U.S. PATENT DOCUMENTS 5,101,404  3/1992  Kumimoto et al. ..................... 370/398
5,548,587  8/1996  Bailey et al. ........................... 370/395

FOREIGN PATENT DOCUMENTS 0 358 597    3/1990  European Pat. Off. .
0 499 150 A1 8/1992  European Pat. Off. .
37 38 177 A1 5/1989  Germany .

OTHER PUBLICATIONS

IEICE Transactions, vol. 74, No. 11, Nov. (1991), "Requirements of Nodal system Architecture", by Sato et al, pp. 3645–3651.
IEEE Global Telecommunications Conference, vol. 3, (1993), "An ATM Cross–Connect System for Broadband Trials and Applications", ENG et al, pp. 1454–1460.
Siemens publication (1992), ATM Technologie für zukünftige Breitbandnetze, (ATM Technology for Future Broadband Networks), pp. 1–22.
Telcom Report 13, (1990), Mit ATM zur bitratenvariablen Kommunikation, (With ATM to Bit–Variable Communication), pp. 4–7.

Primary Examiner—Chi H. Pham
Assistant Examiner—Frank Duong
Attorney, Agent, or Firm—Hill & Simpson

[57] ABSTRACT

An ATM communication system with a modular structure for the switching of packeted cells (Z) between ATM communication terminals (KE) over dial-up or fixed connections has a switching device (SB) and a remote control device (CB). Arranged in the switching device (SB) is an ATM switching matrix module (ASN), at least one subscriber line module (SLMP), a communication module (KM) and a clock module (TM), and the control device (CB) is formed by a personal computer (PC) which controls the switching device (SB) in terms of operation, switching and administration and in which a processor-controlled communication adaptor (CA) is provided for the exchange of information with the switching device (SB). This concept of a switching device (SB) and a separate control device (CA) in a personal computer (PC) achieves the effect of largely isolating hardware and software and brings about a considerable increase in the modularity and freedom of configuration of ATM communication systems (KS), in particular relatively small ATM communication systems.

1 Claim, 3 Drawing Sheets

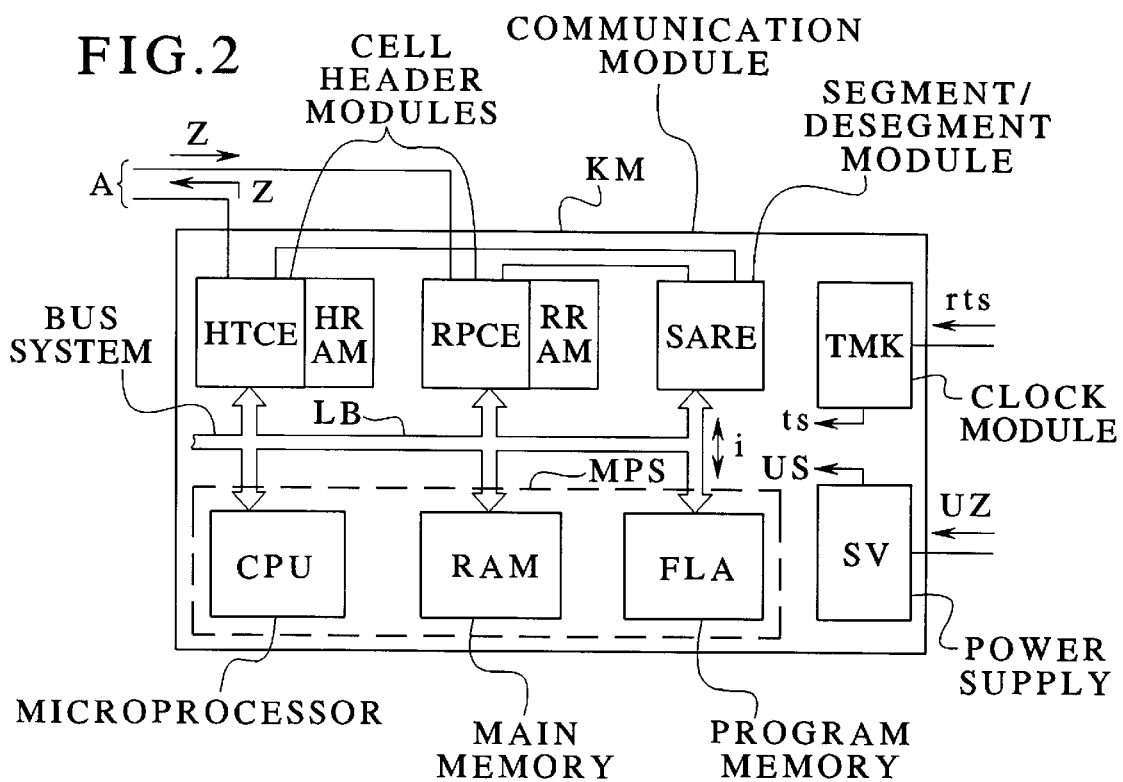
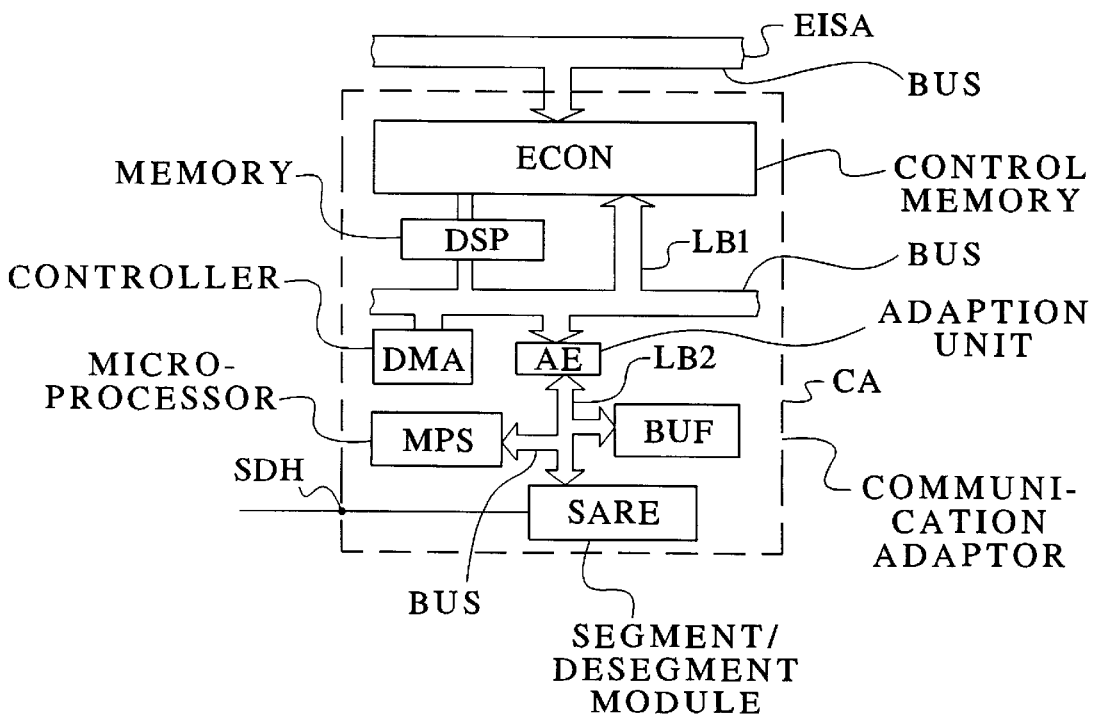

ATM COMMUNICATION SYSTEM WITH A MODULAR STRUCTURE

BACKGROUND OF THE INVENTION

ATM communication system with a modular structure serve for the connection of communication terminals with high transmission rates in private and public communication networks. The transmission and switching of the messages take place using the Asynchronous Transfer Mode, in which the information items to be transmitted are transmitted and switched in packet form, i.e. with packets of fixed length (cells) in accordance with CCITT standard I.361. Internationally standardized transport bit rates are currently 155 and 622 Mbit/s. With the aid of channel and path information inserted in the cell headers of the cells, the cells are transmitted over a virtual transmission channel from one communication terminal via a communication system to a particular communication terminal. The transmission channel is set up by signaling from a subscriber—as in the known time-division multiplex communication systems—or by an administrative input at the communication system and is logically retained for the duration of the connection. The bandwidth of such a transmission channel is flexible and is applied for when the connection is established. Such basic functions of ATM communication systems are known from the publication "ATM Technologie für zukünftige Breitbandnetze" [ATM Technology for Future Broadband Networks], Siemens, 1992.

A structure of an ATM communication system having such functions is known from telcom report 13, "Mit ATM zur bitvariablen Kommunikation" [With ATM to Bit-Variable Communication], 1990, pages 4–7. In the case of this structure, the ATM communication system or the ATM switching device is formed by a line trunk group having subscriber line modules, by an ATM switching matrix and by a central controller, the central controller being connected directly to the subscriber line modules for a transmission of switching, operation and dependability information. In this concept, a modification of the configuration of the communication system involves considerable hardware and software modifications.

A further ATM communication system for the switching of packeted cells between ATM communication terminals over dial-up or fixed connections is known from the publication IEEE IN HOUSTON GLOBECOM '93 . . . . In this system, there are a plurality of subscriber line modules which are equipped with SDH subscriber interfaces and are known as "Line Cards" connected to an ATM switching matrix, which is provided with a plurality of bidirectional terminal connections and operates by ATM, in each case via a multiplexer/demultiplexer stage referred to as a "Fabric Interface". It is also the case with this concept that, in particular, configuration modifications to the switching software bring about considerable hardware and software modifications.

Furthermore, in European Patent Specification EP-A2 0 358 597 there is described a modular communication system having a switching device and having a personal computer realizing a control device, there being integrated in the switching device a switching matrix of which the terminal connections are connected to subscriber line modules. Both in the switching device and in the control device there are defined corresponding interfaces, which permit an exchange of information or data between the two units. The control device according to the disclosed arrangement serves for expanding an existing switching device by adding any desired additional features, while ensuring the necessary operational dependability. Consequently, software modifications, in particular to the switching software, in the switching device likewise cause software modifications in the control device.

SUMMARY OF THE INVENTION

To be regarded as the object on which the invention is based is that of providing a structure of an ATM communication system with greater modularity and more flexible configuration. The object is achieved by a modular ATM communication system for the switching of packeted cells between ATM communication terminals over dial-up or fixed connections. The system has at least one switching device with a central device. The switching device has an ATM switching matrix module, which is provided with a plurality of bidirectional terminal connections and operates using the Asynchronous Transfer Mode. The terminal connections thereof which are connected to at least one subscriber line module, realizing at least one SDH subscriber interface, and to a communication module. A clock module, providing the clock signals for the ATM switching matrix module, the subscriber line modules and the communication module. The central device is formed by a personal computer, which controls the switching device in terms of operation, switching and administration. A processor-controlled communication adaptor controls and monitors the exchange of information with the switching device and is connected to one of the subscriber interfaces and to the personal computer. The system allows transmission of switching, dependability and administration information, there being defined in the communication module and in the control device a transport interface, and also a switching interface, a dependability interface and an operation interface.

Advantageous developments of the present invention are as follows.

The communication module is equipped with a bus system, to which there is connected a first cell header module with an assigned RAM memory. Internal cell headers, provided for self-control of the cells containing switching, operation and dependability information by the ATM switching matrix module are formed and are attached to the cells. There is connected a second cell header module with an assigned RAM memory, in which the internal cell headers are removed before a transmission of the cells containing switching, operation and dependability information to the control device. There is connected a segmentation and desegmentation module, inserting into cells the switching, operation or dependability information to be transmitted or removing such information from the transmitted cells. There is connected a microprocessor system, controlling and monitoring the communication module. In a further clock module, the clock signals for a transmission to the ATM switching matrix module and the control device are derived from the reference clock signals transmitted from the clock module and are distributed to the components of the communication module.

The communication adaptor is formed by a segmentation and desegmentation module, which has an assigned buffer memory and realizes an SDH subscriber interface. A microprocessor system is data isolated from a DMA controller by two local buses. An EISA control module realizes an EISA bus connection, an EISA communication bus being arranged in the personal computer.

To be regarded as an essential aspect of the communication system according to the invention is that the communication system is divided into two devices, namely into a switching device and a control device, and the control device is connected like an ATM communication terminal to the switching device. In the switching device, although the cells are switched with the aid of the ATM switching matrix, the switching control is effected by the switching program implemented in the control device. For information transmission, the switching device is equipped with a communication module and the control device is equipped with a communication adaptor. For this purpose, to allow transmission of switching, dependability and administrative information, there is defined in the communication module and in the control device a transport interface, and also a switching interface, a dependability interface and an operation interface. This definition achieves the effect of largely isolating the hardware and software and consequently of considerably increasing the modularity and freedom of configuration of ATM communication systems, in particular relatively small ATM communication systems. The control device is advantageously realized by a commercially available personal computer, just having an adaptor incorporated in its circuitry. In the program memories of the personal computer there are stored all the essential programs for the switching, operation and dependability control of the switching device. This concept of the control device in a personal computer on the one hand achieves a particularly cost-effective setup and on the other hand makes it possible to dispense with a separate operator terminal.

The communication module is advantageously equipped with a bus system, to which there is connected a cell header module with an assigned RAM memory, in which internal cell headers provided for the self-control of the cells containing switching, operation and dependability information by the switching matrix are formed and are attached to the cells, and there is connected a further cell header module with an assigned RAM memory, in which the internal cell headers are removed before a transmission of the cells containing switching, operation and dependability information to the control device. Furthermore, there is connected to the bus system, to allow packing of the information to be transmitted in cells and for unpacking the information from transmitted cells, a segmentation and desegmentation module and a microprocessor system, controlling and monitoring the communication module, and also a clock pulse processing module, in which the transmission clock pulses for a transmission to the ATM switching matrix module and the control device are derived from the reference clock signals transmitted from the clock module and are distributed to the components of the communication module. This advantageous concept additionally makes it possible to realize a cost-effect setup by means of commercially available and customer-programmable integrated circuits.

According to a further advantageous refinement of the communication system according to the invention, the communication adaptor is formed by a line module, realizing an ATM subscriber connection, and an EISA control module, realizing an EISA bus connection, an EISA communication bus being arranged in the personal computer. This concept achieves a high data throughput for a cost-effective amount of expenditure to realize the setup.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 2 shows the construction of the communication module, FIG. 3 shows the construction of the communication adaptor and FIG. 4 shows the construction of the subscriber line module.

DESCRIPTION OF THE PREFERRED EMBODIMENTS

Figure 1:
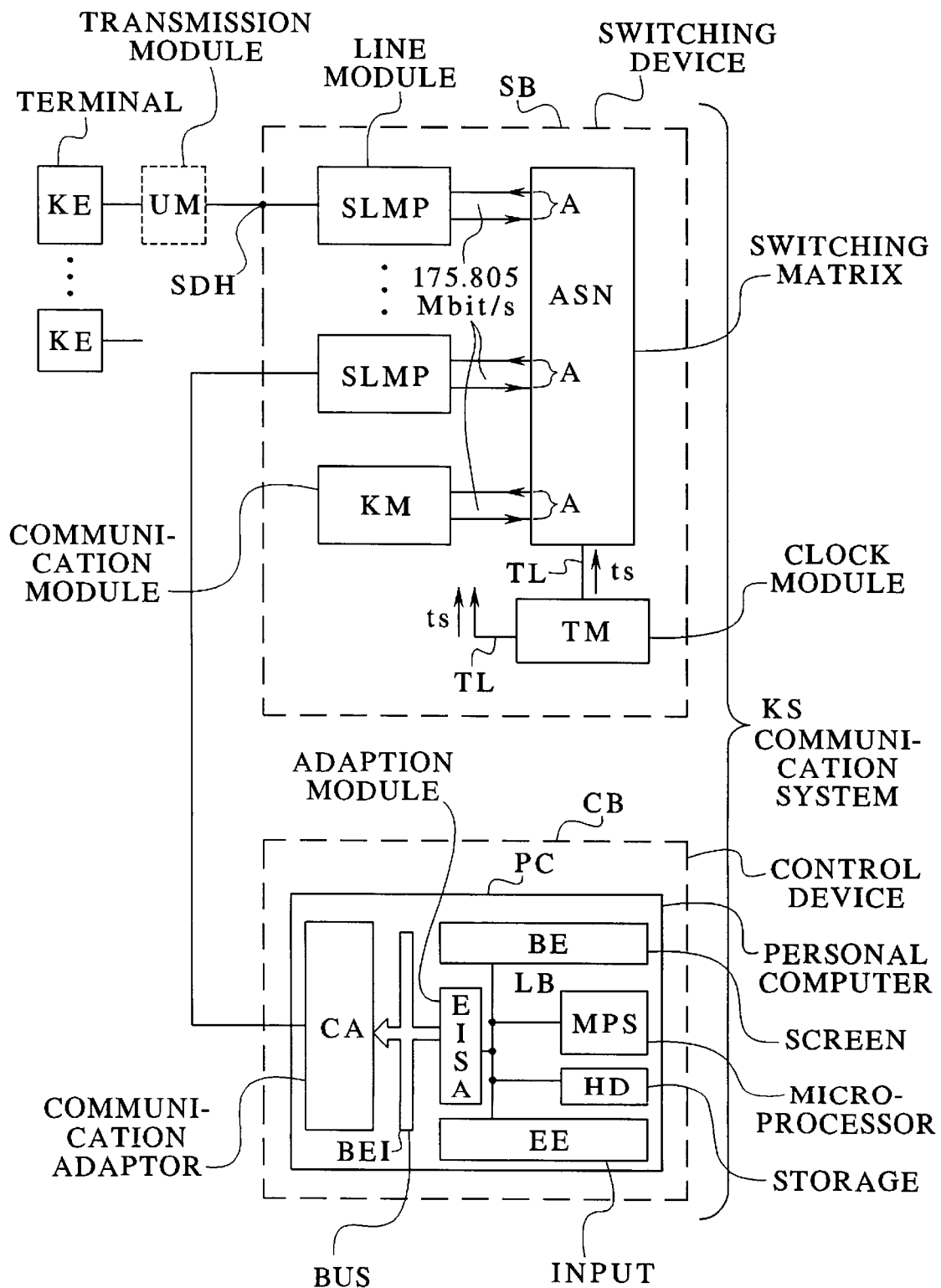
FIG. 1 shows the structure of an ATM communication system with a modular structure.

FIG. 1 shows a communication system KS, which is formed by a switching device SB and by a control device CB.

Arranged in the switching device SB is an ATM switching matrix module ASN, operating by the Asynchronous Transfer Mode, a plurality of subscriber line modules SLMP, a communication module KM and a clock module TM.

The ATM switching matrix module ASN is designed, for example, with sixteen bidirectional terminal connections A with a transmission rate of 175.805 Mbit/s each. For the switching of cells formed on the basis of the Asynchronous Transfer Mode, they are switched in accordance with the accompanying switching information via the ATM switching matrix module ASN according to the self-switching principle. This means that, with the aid of the accompanying switching information—for example in a preceding, additional cell header—a cell is switched independently via the switching matrix module ASN. The information items are physically transmitted by differential shifted ECL (Emitter Coupled Logic) signals, NRZ (Non Return to Zero)-coded, to each of the sixteen terminal connections A of the processor-controlled ATM switching matrix module ASN. The ATM switching matrix module ASN is realized, for example, according to the switching matrix disclosed in European reference EP 0 329 005 B1.

A subscriber line module SLMP or a communication module KM can be connected to each of the sixteen terminal connections A, a communication module KM being provided in a switching device SB. In FIG. 1, two subscriber line modules SLMP are represented by way of example for a maximum of fifteen connectable subscriber line modules.

In the clock module TM, clock signals to required for the operation of the ATM switching matrix module ASN, of the subscriber line modules SLMP and of the communication module KM are formed and are transmitted over separate clock lines TL to the respective components of the switching device SB. These clock signals ts are intended in particular for the operation of the microprocessors used in the components SLMP, ASN, KM of the switching device SB and for the transmission of the information via the interfaces in accordance with the switching device.

For the connection of communication terminals KE operating by the Asynchronous Transfer Mode, the subscriber line modules SLMP are equipped with an SDH (Synchronous Digital Hierarchy) interface SDH with a transmission rate of 155 Mbit/s. The data or information transmission via the SDH interface SDH is carried out in accordance with CCITT recommendation I.121 (User Network Interface UNI) in the Synchronous Transfer Mode (STM-1) at a transmission rate of 155.52 Mbit/s. The construction and mode of operation of the subscriber line modules SLMP is explained in more detail in FIG. 3.

Indicated by a rectangle represented in dashed lines and inserted between the communication terminal KE and the subscriber line module SLMP are transmission modules UM, with the aid of which remote communication terminals KE are connected to the switching device SB. The transmission modules UM contain transmission devices—not shown—for electrical transmission of the cell-oriented information over coaxial cables in accordance with CCITT recommendation G.703 or for an optical transmission over optical waveguides in accordance with CCITT recommendations G.957/958.

Such broadband communication terminals KE for the connection to the switching device SB can be realized by a multiplicity of devices. Mentioned by way of example are terminal connections to further ATM communication systems KS, adaptors for the connection of local area networks, ISDN switching devices—for example to the HICOM switching system—and ATM workstations.

With the aid of the communication module KM, the cells to be transmitted from the control device CB or to it are controlled. For this purpose, a layer 2 function, corresponding to the ISO layer model, and a layer 3 function, intended for the switching of the cells within the switching device SB, are realized in the communication module KM. Furthermore, the communication module KM comprises a switching subfunction, with the aid of which switching, administrative and operation messages transmitted from the control device CB and in the reverse direction are transformed into messages conforming to the switching device, i.e. in relation to the physical design of the switching device SB.

For the communication of the switching device SB with the control device CB, the latter is equipped with a communication adaptor CA. The communication adaptor CA is arranged in a personal computer PC, realizing the control device CB. In the known way, the personal computer PC, realized by a commercially available personal computer, has a screen device BE, an input device EE, mass storage devices HD—for example hard disks—and a microprocessor system MPS. In addition, an adaptation module EISA, realizing an EISA bus BEI, is integrated in the personal computer PC, the communication adaptor CA being connected to the EISA bus BEI. The components BE, EE, MPS, HD, EISA of the personal computer PC communicate via an internal local bus LB. The EISA bus is a bus which is isolated from the internal, local bus LB and has a bit width of 32 bits and a transfer rate of 33 Mbyte/s.

FIG. 2 shows the communication module KM in a block diagram. Arranged in this communication module is a bus system LB of a microprocessor system MPS. The microprocessor system MPS is formed by a commercially available microprocessor CPU—for example a microprocessor SAB 80 386 DX from the Siemens company—and by a main memory RAM and a program memory FLA. The program memory FLA is preferably realized by a flash memory. The components CPU, RAM, FLA of the microprocessor system MPS are in each case connected to the bus system LB formed by address, data and control lines.

For sending and receiving cells Z to and from the terminal connection A of the ATM switching matrix module, two cell header modules HTCE, RPCE, which are each connected to the bus system LB, are provided in the communication module KM. With the aid of the first cell header module HTCE, internally formed cell headers are attached to the cells Z to be transmitted, to allow self-controlling switching via the ATM switching matrix module ASN. With the aid of these internal cell headers, the cells Z are controlled by the ATM switching matrix module ASN, as explained in FIG. 1. With the aid of the second cell header module RPCE, the internal cell headers of the cells Z transmitted from the ATM switching matrix module ASN are removed. Cells Z whose receivers are within the switching device SB have in the internal cell header further special entries, with the aid of which further, internal cell headers are formed to allow transmission to a component of the switching device VE, are attached to the corresponding cell Z and are transmitted via the ATM switching matrix module ASM to the respective component. For the generation of the internal cell headers and their removal under real-time conditions, the additional data required for this purpose are stored in RAM memories HRAM, RRAM respectively assigned to the cell header modules HTCE, RPCE. The two cell header modules HTCE, RPCE are realized, for example, in each case in an ASIC (Application Specific Integrated Circuit).

Connected furthermore to the bus system LB is a segmentation and desegmentation module SARE. With the aid of this segmentation and desegmentation module SARE in accordance with CCITT recommendation I.363, the information formed by the microprocessor system MPS is packed in cells Z and the cells Z transmitted from another module in the switching device SB or the control device CB are unpacked, ie. the information is taken out of the cells Z and is transmitted to the microprocessor system MPS. This segmentation and desegmentation function is required whenever, to allow an assessment or response in or by the microprocessor system MPS, information is transmitted to the latter or is transmitted from the latter to other modules.

With the aid of the microprocessor system MPS, the switching, operation or dependability information transmitted by the control device CP or the components SLMP, ASN, TM is assessed and, dependent on the content of the transmitted information, corresponding responses are initiated or passed on.

Provided in the communication module KM is a further clock module TMK and a power supply SV. With the aid of the further clock module TMK, the clock signals ts required for the clock control of the two cell header modules HTCE, RPCE and of the segmentation and desegmentation module SARE are derived from the reference clock signals rts, transmitted by the clock module TM, and are transmitted to said modules. The voltages US required for the operation of the components of the communication module KM are derived from a central power supply UZ with the aid of the power supply SV.

FIG. 3 shows the communication adaptor CA in a block diagram—the adaptor being outlined by dot-dashed lines. With the aid of an EISA control module ECON, arranged in the communication adaptor CA, the connection to the personal-computer internal EISA communication bus EISA is established. The EISA communication bus EISA, formed by data, address and control lines, has a bit width of 32 bits, a clock frequency of 8.33 MHz and a transfer rate of 33 Mbit/s. The EISA control module ECON represents the link to a first local bus LB1. This first local bus LB1, likewise formed by data, control and address lines, has a bit width of 16 bits and a clock frequency of 20 MHz. For rate adaptation between the EISA communication bus EISA and the first local bus LB1, a dynamic memory DSP is additionally inserted.

Between the first local bus LB1 and a second local bus LB2, an adaptation unit AE is provided for the dynamic exchange of data. With the aid of this adaptation unit AE, the data to be transmitted are adapted from the first local bus LB1 to the 32-bit-wide, second local bus LB2 at a clock frequency of 20 MHz, and vice versa. Both the first local bus LB1 and the second local bus LB2 are controlled by the microprocessor system—realized, for example, by a microprocessor system SAB 80 486 from the Siemens company. For rapid access to the program and data memory arranged in the microprocessor system MPS, a DMA (direct memory access) controller DMA is coupled to the first bus LB1. The DMA controller DMA is realized, for example, by the integrated circuit SAB 82 380 from the Siemens company.

For the realization of the subscriber line interface SDH, a segmentation and desegmentation module SARE is provided in the communication adaptor CA. With the aid of this segmentation and desegmentation module SARE, the information to be transmitted is packed in cells Z and unpacked. For the buffer storage of the information or cells Z to be sent from or received by the segmentation and desegmentation module SARE, a buffer memory BUF is connected to the second local bus LB2. An ATM transmission system—not shown—can be connected to the segmentation and desegmentation module SARE for an electrical transmission of the signals over a coaxial line or an optical transmission over optical waveguides (see explanations with respect to FIG. 2).

The communication adaptor CA serves for linking a personal computer—for example a Unix workstation—to the switching device SB. The communication adaptor CA can be used both for the connection of a personal computer PC, designed as controlling device CB, or a workstation and for the connection of multimedia communication terminals KE—for example multimedia workstations—to one another for the transmission of audio, video and data signals.

Figure 4:
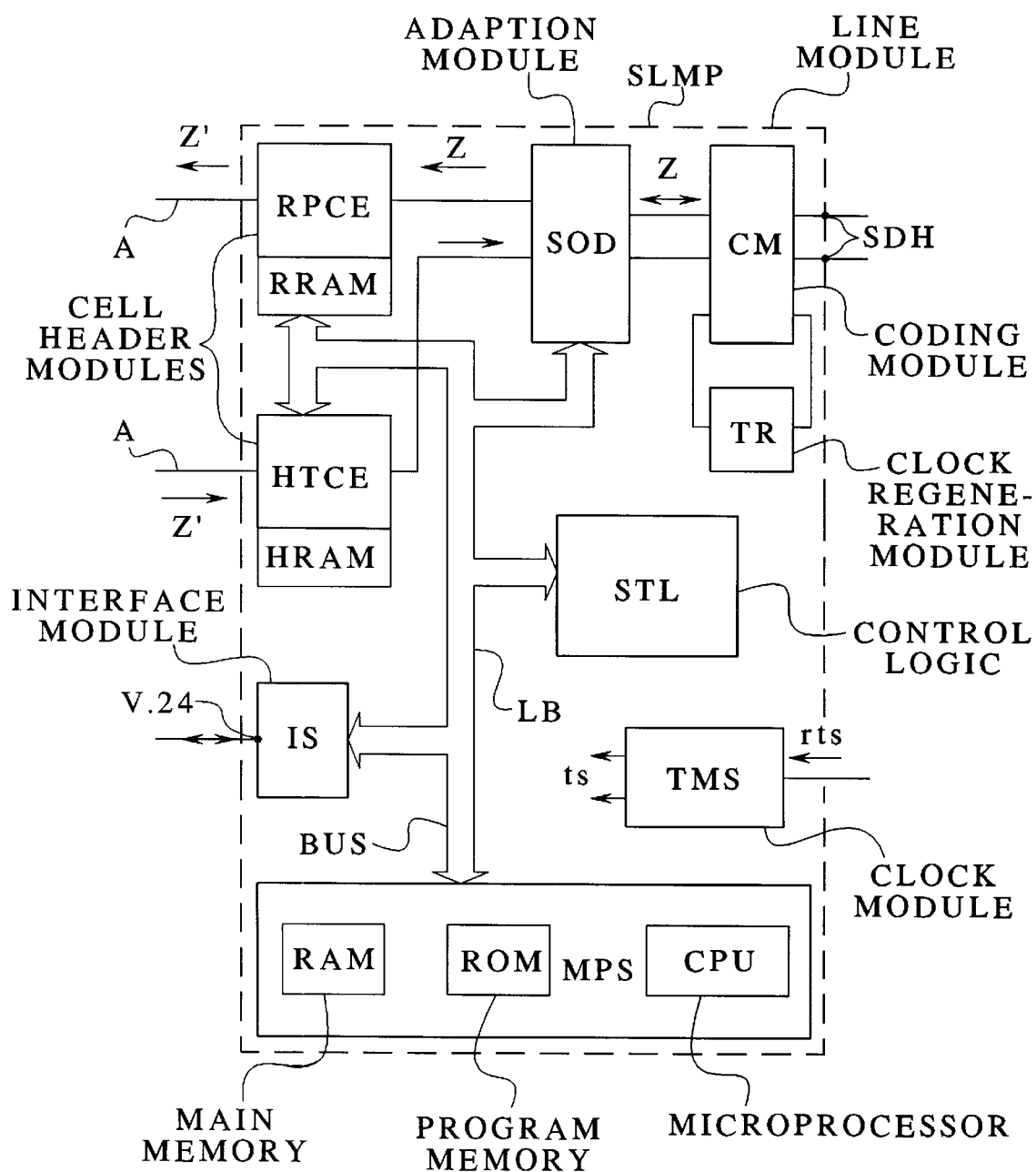

FIG. 4 shows the construction of a subscriber line module SLMP. For sending and receiving cells Z to and from the terminal connection A of the ATM switching matrix module ASN, two cell header modules HTCE, RPCE, connected to a local bus system LB, are provided in the subscriber line module SLMP—see also FIG. 2. With the aid of the first cell header module HTCE, ASN-internal cell headers are attached to the cells Z to be transmitted, to allow self-controlling switching via the ATM switching matrix module. With the aid of the internal cell headers, the cells Z are controlled by the ATM switching matrix module ASN, as explained in FIG. 1. With the aid of the second cell header module RPCE, the internal cell headers are removed from the cells Z transmitted by the ATM switching matrix module ASN. Cells Z which are to be transmitted to the subscriber line module SLMP are unpacked and sent via the local bus LB to a microprocessor system MPS to allow an assessment. For the generation of the internal cell headers and their removal under real-time conditions, the additional data required for this purpose are stored in RAM memories HRAM, RRAM respectively assigned to the cell header modules HTCE, RPCE. The two cell header modules HTCE, RPCE are realized, for example, in each case in an ASIC.

The microprocessor system MPS is formed by a microprocessor CPU, a program memory ROM and a main memory RAM. The microprocessor CPU is realized, for example, by a microprocessor SAB 80 C 186 from the Siemens company and the program memory ROM is realized, for example, by a flash EPROM.

The cells Z are transmitted from the first and to the second cell header module HTCE, RPCE through an adaptation module SOD. In the adaptation module SOD, the incoming cells Z are converted from synchronous transfer format (STM-1) into an asynchronous transfer format (ATM). In this conversion, the information is already transmitted or processed in parallel—for example 4-bit parallel. Furthermore, the scrambling or descrambling of the data or information transmitted is carried out in this adaptation module SOD. The adaptation module SOD is, furthermore, connected to a coding module CM, in which the parallel signals are converted into a serial information flow, and vice versa. Furthermore, a code conversion is carried out. In this conversion, the NRZ (Non Return to Zero)-coded signals are converted into CMI (Coded Mark Inversion)-coded signals at the SDH subscriber interface SDH. For the decoding or decoding in both directions, a clock regeneration is carried out in a clock regeneration module TR, connected to the coding module CM. For this purpose, additional filter circuits are implemented in the clock regeneration module TR. The subscriber interface SDH represents an asymmetrical interface with a serial data transmission, operating in the synchronous transfer mode, at a rate of 155.52 MBit/s. The adaptation module SOD is, furthermore, connected to the local bus LB, via which the adaptation module SOD is monitored and controlled by the microprocessor system MPS. The local bus LB is, furthermore, connected to a control logic device STL. With the aid of this control logic device, the subscriber line module SLMP is set to a defined initial state and optical displays indicating error states and operational states are controlled.

The local bus is, furthermore, connected to an interface module IS, in which a V.24 interface is realized, to allow checks and tests of the subscriber line module SLMP.

Furthermore, arranged in the subscriber line module SLMP is a further clock module TMS, with the aid of which the clock signals ts required for the clock control of the two cell header modules HTCE, RPCE and also of the adaptation module SOD and of the microprocessor system MPS are derived from the reference clock signals rts, transmitted from the clock module TM, and are transmitted to these modules.

With the aid of the programs stored in the program memory ROM, all the messages received from the communication module KM are managed in the subscriber line module SLMP, the setting up and clearing down of ATM fixed or dial-up connections are controlled by setting a translator in the first cell header module HTCE and the components of the subscriber line module SLMB are monitored. Furthermore, all the switching, operation and dependability messages which are to be transmitted to the components of the switching device SB or are transmitted by them are saved in accordance with the layer 2 procedure—ie. by the HDLC transmission procedure—and are transmitted to the respective components via the ATM switching matrix module ASN. For this purpose, a corresponding internal cell header is to be attached to the respective cells Z.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A modular ATM communication system for the switching of packeted cells between ATM communication terminals over dial-up or fixed connections, comprising:

at least one switching device;

said at least one switching device having an ATM switching matrix module, which is provided with a plurality of bidirectional terminal connections, operates using the Asynchronous Transfer Mode and the terminal connections of the switching matrix being connected to
- at least one subscriber line module, that forms at least one SDH subscriber interface, and
- to a communication module, said at least one switching device having a clock module, providing clock signals for bit-by-bit transmission of cells in the ATM switching matrix module, the subscriber line modules and a communication module;

a control device;
- said control device being formed by a personal computer, which controls the switching device in terms of operation, switching and administration and in which
  - there is provided a processor-controlled communication adaptor, controlling and monitoring exchange of information with the switching device and connected to one of the SDH subscriber interfaces and to the personal computer;
  - for transmission of switching, dependability and administration information, there is defined in the communication module and in the control device a transport interface, and also a switching interface, a dependability interface and an operation interface;
  - the communication adaptor being formed by a segmentation and desegmentation module, which has an assigned buffer memory and realizes an SDH subscriber interface,
- a microprocessor system and a DMA controller that are connected by two local buses, and
- a bus control module that realizes a bus connection, the communication bus being arranged in the personal computer.

* * * * *